(12) United States Patent
Yamada et al.

(10) Patent No.: US 7,079,162 B2
(45) Date of Patent: Jul. 18, 2006

(54) MATRIX DRIVEN LIQUID CRYSTAL DISPLAY MODULE SYSTEM, APPARATUS AND METHOD

(75) Inventors: Fumiaki Yamada, Yokohama (JP); Yoshitami Sakaguchi, Zama (JP)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 10/430,139

(22) Filed: May 6, 2003

(65) Prior Publication Data

US 2003/0193463 A1    Oct. 16, 2003

Related U.S. Application Data

(62) Division of application No. 09/312,004, filed on May 14, 1999, now Pat. No. 6,556,181.

(51) Int. Cl.
*G09G 5/10* (2006.01)
(52) U.S. Cl. .......................... 345/690; 345/84; 345/88
(58) Field of Classification Search ................. 345/88, 345/89, 102, 150–152, 589, 186, 598, 600, 345/507, 510, 520, 147, 148, 149, 523, 593, 345/84, 690, 691, 692, 693; 349/1, 2, 3, 349/4, 5, 6, 7, 8, 9, 10; 348/742, 743
See application file for complete search history.

(56) References Cited

U.S. PATENT DOCUMENTS

| | | | | |
|---|---|---|---|---|
| 4,479,143 A | * | 10/1984 | Watanabe et al. | 348/276 |
| 5,043,917 A | * | 8/1991 | Okamoto | 345/550 |
| 5,191,450 A | * | 3/1993 | Yajima et al. | 349/8 |
| 5,402,141 A | * | 3/1995 | Haim et al. | 345/88 |
| 5,767,837 A | * | 6/1998 | Hara | 345/694 |
| 5,808,594 A | * | 9/1998 | Tsuboyama et al. | 345/89 |
| 6,008,868 A | * | 12/1999 | Silverbrook | 348/790 |
| 6,100,861 A | * | 8/2000 | Cohen et al. | 345/88 |

\* cited by examiner

*Primary Examiner*—Richard Hjerpe
*Assistant Examiner*—Jean Lesperance
(74) *Attorney, Agent, or Firm*—Thomas, Kayden, Horstemeyer & Risley

(57) ABSTRACT

Provided are a color display driving principle obtained while taking into account a difference in eye sensitivity to the flickering of differently colored lights, a TFT liquid crystal display module structure that is adequate for this method, and a double-panel projection type display device.

The count of the G (green) color data that can be written is increased compared with the count for the other primary colors, or the display period for green can be extended. The repetitive unit is set to R, G, B and G, so that a satisfactory refresh rate can be set for the important color G. Therefore, the overall refresh frequency and the power consumed by the display device can be reduced without deterioration of the display quality, and requests for the time response speeds by the display device can be reduced.

10 Claims, 18 Drawing Sheets

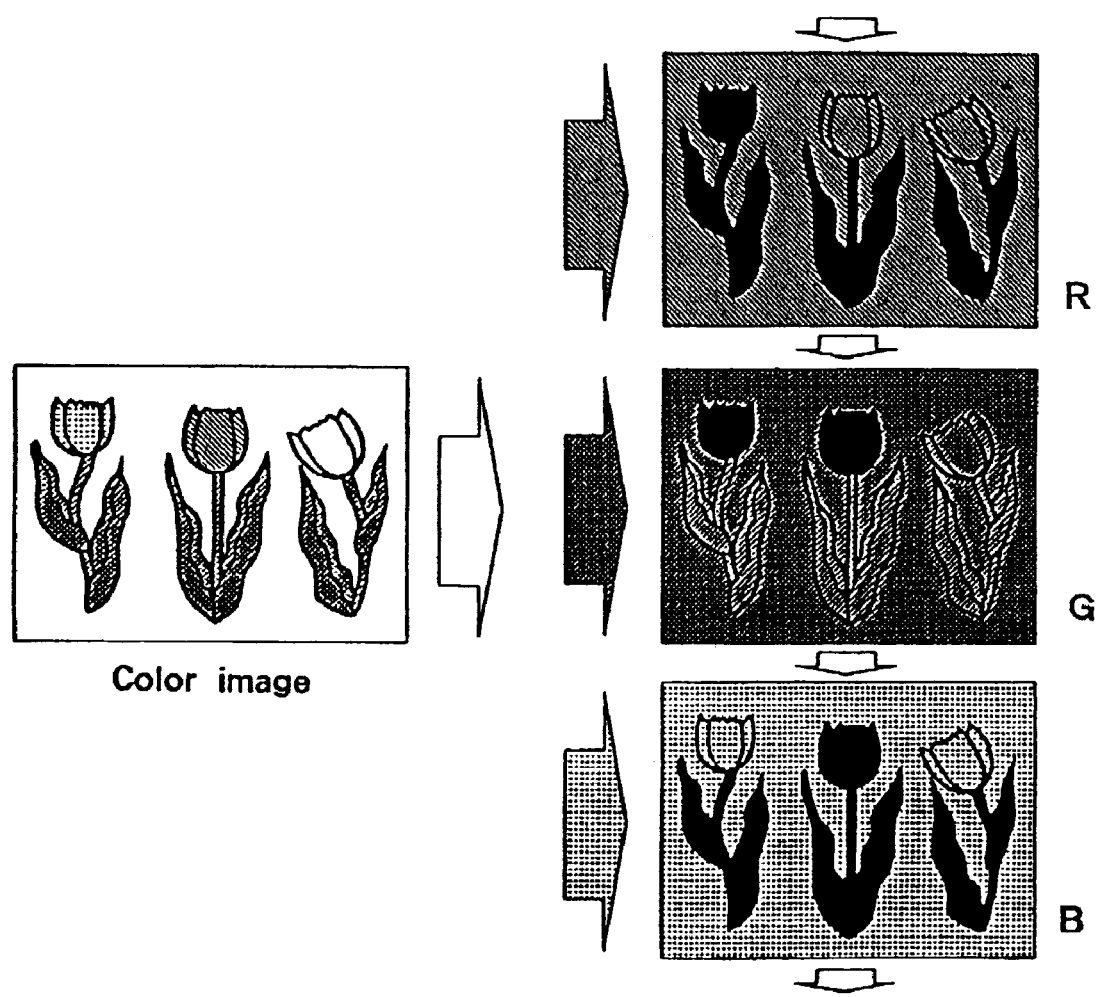

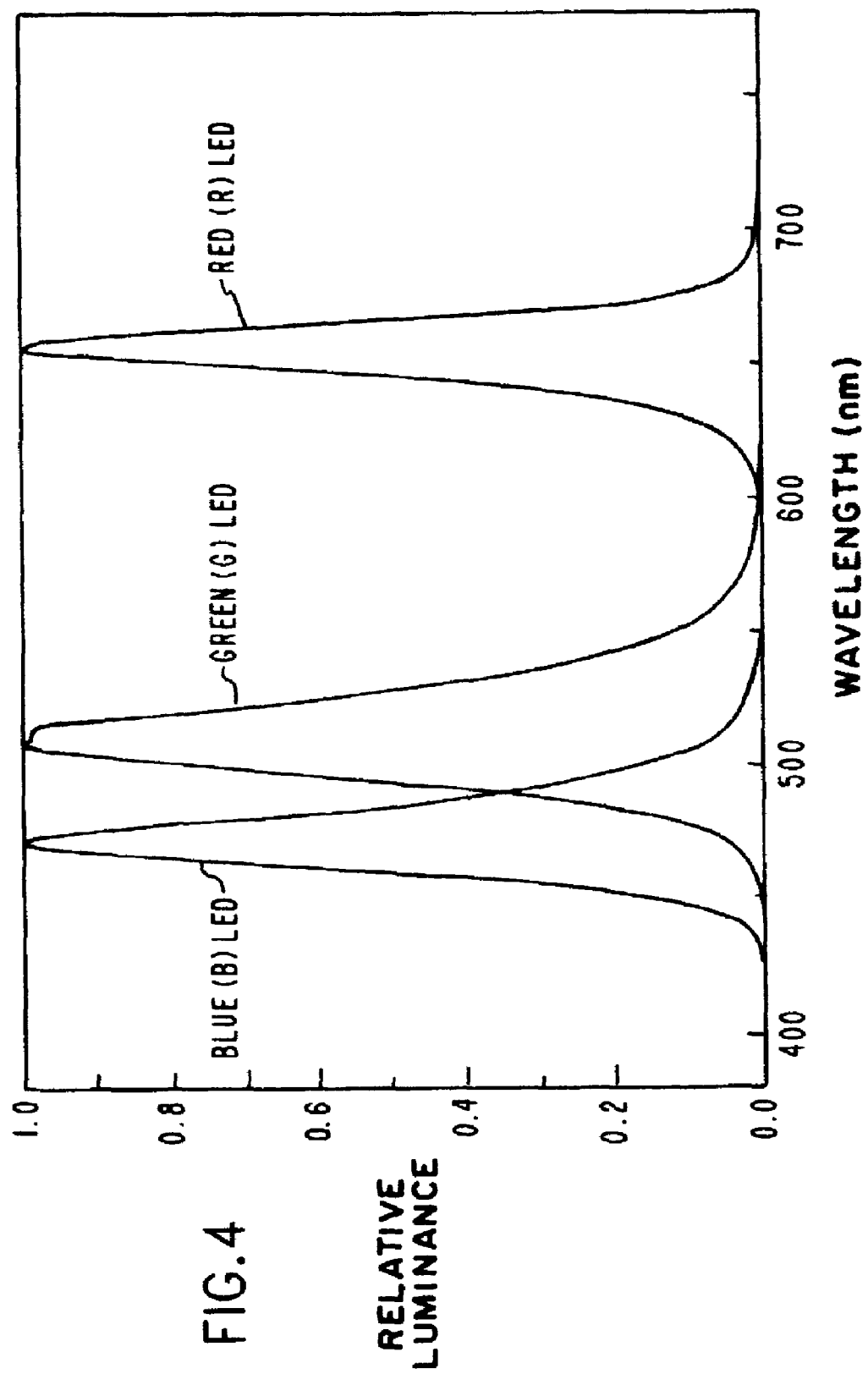

FIG.7
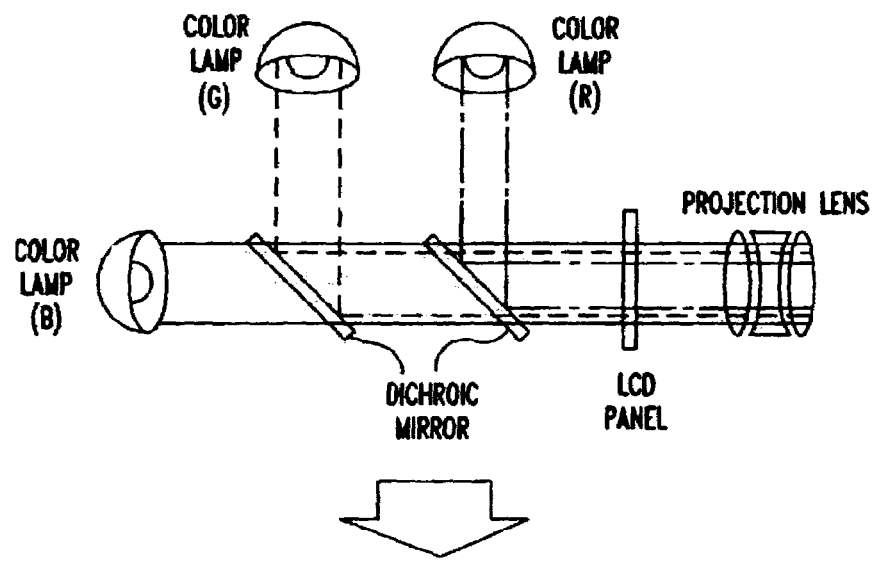
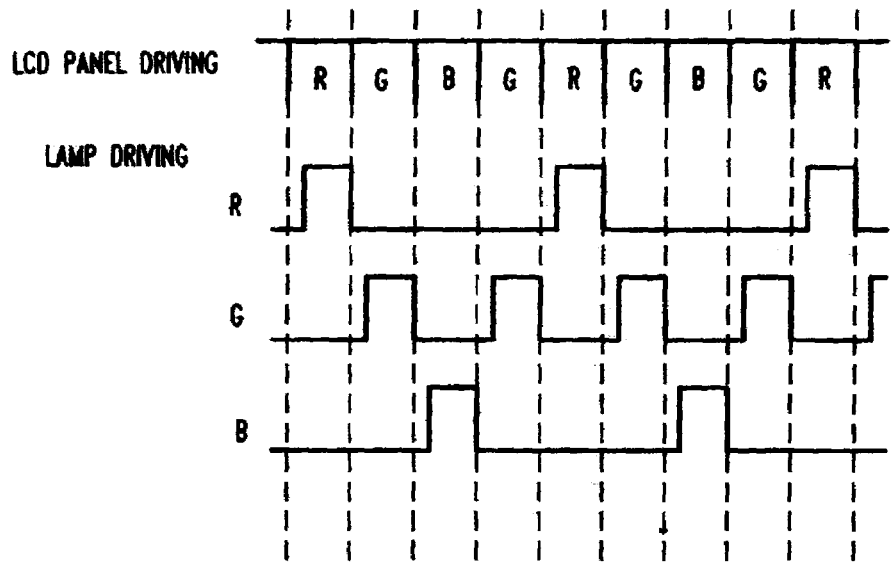

FIG.8
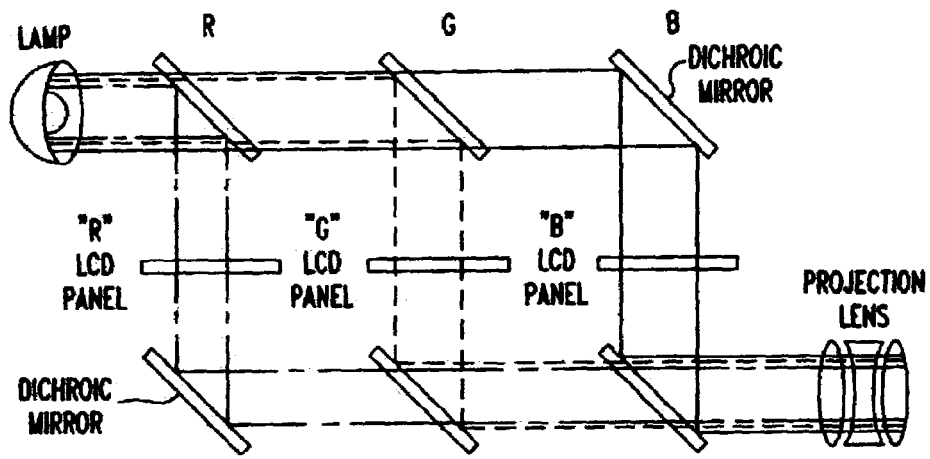
(a)
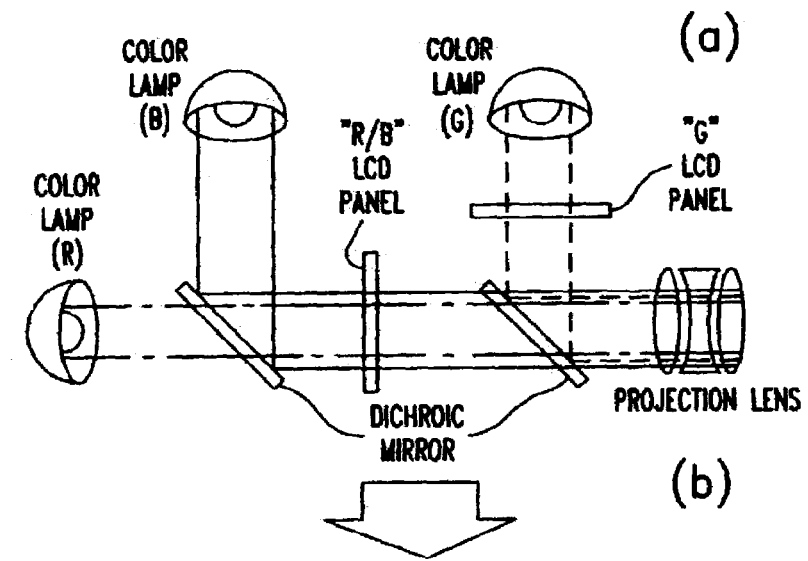
(b)
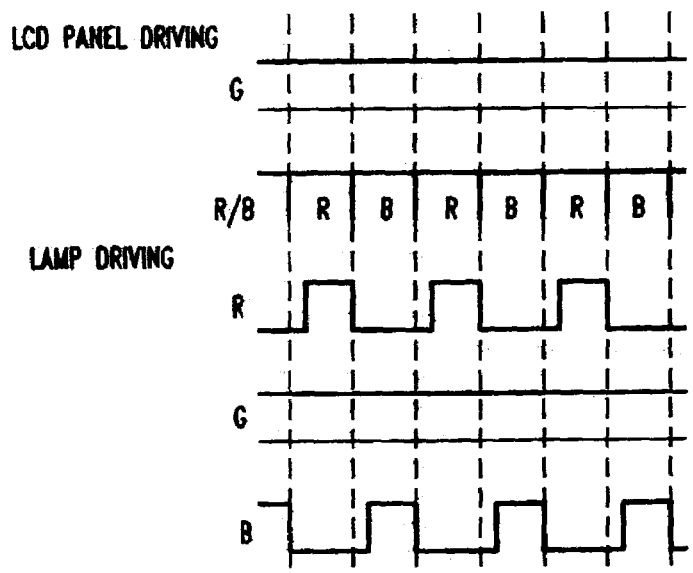

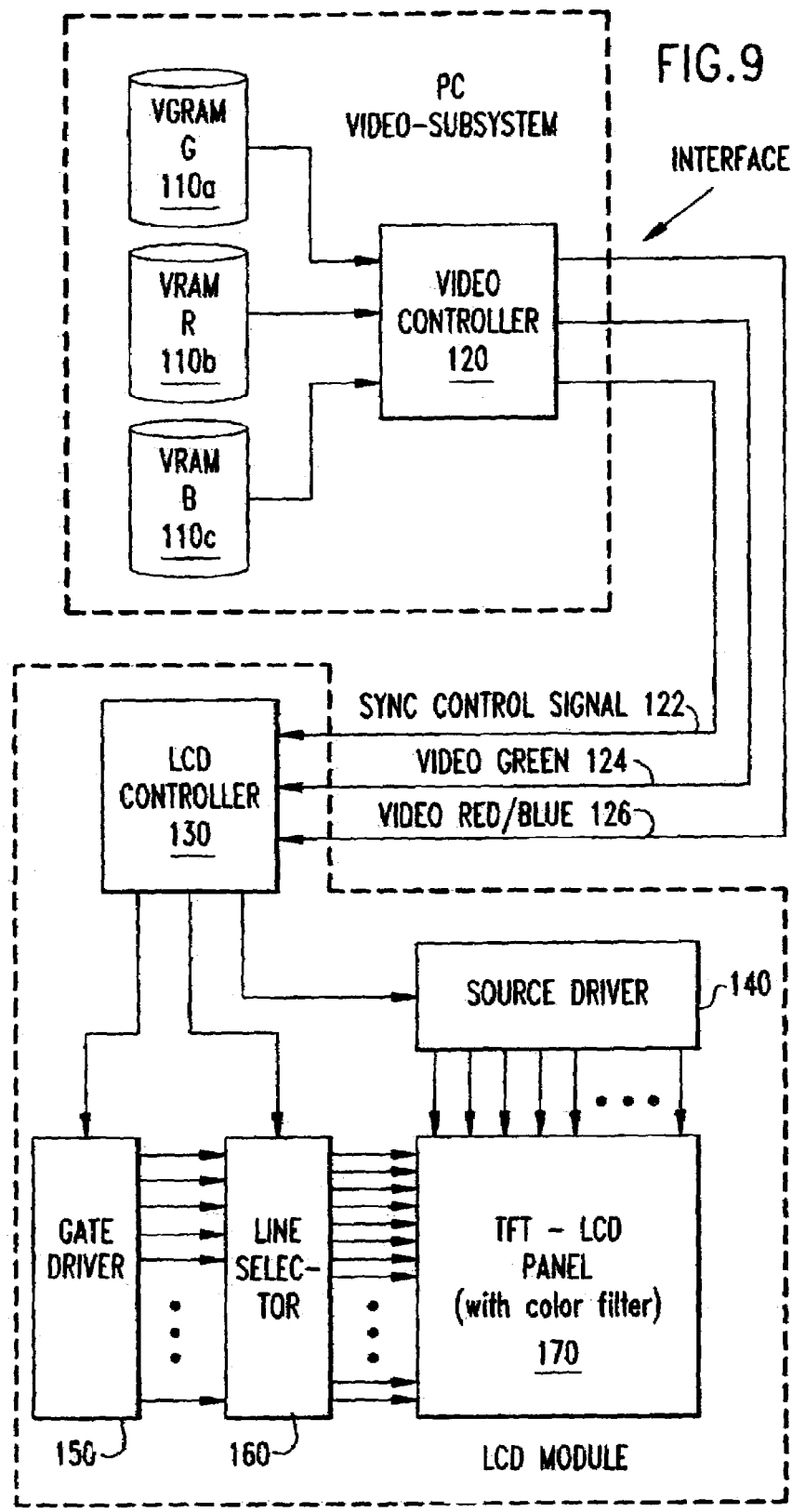

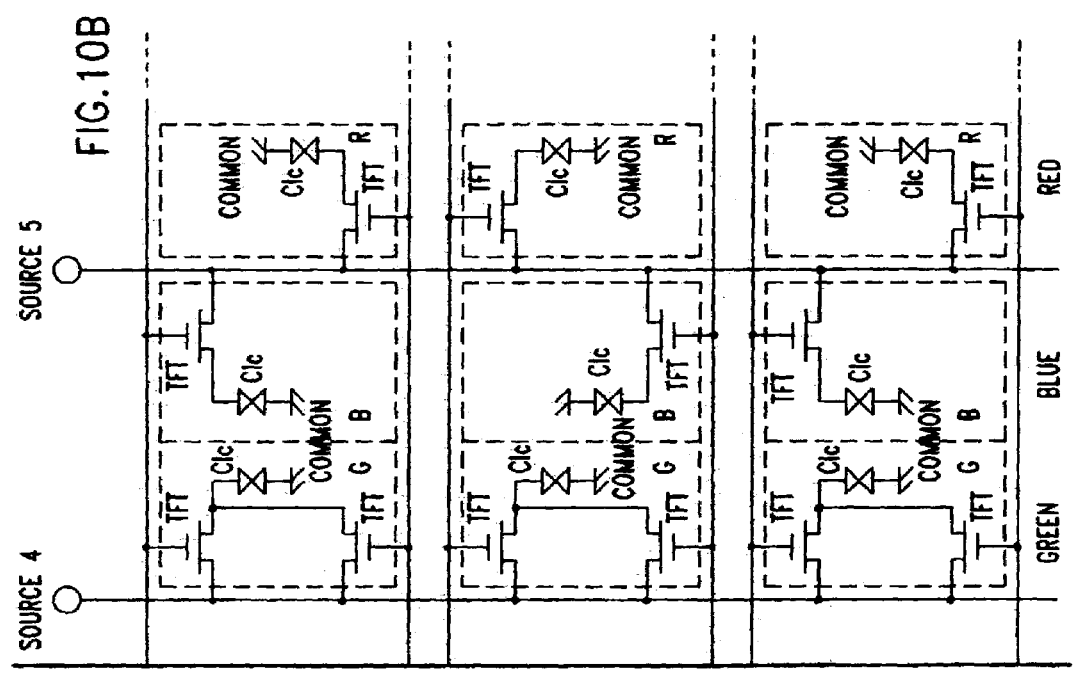

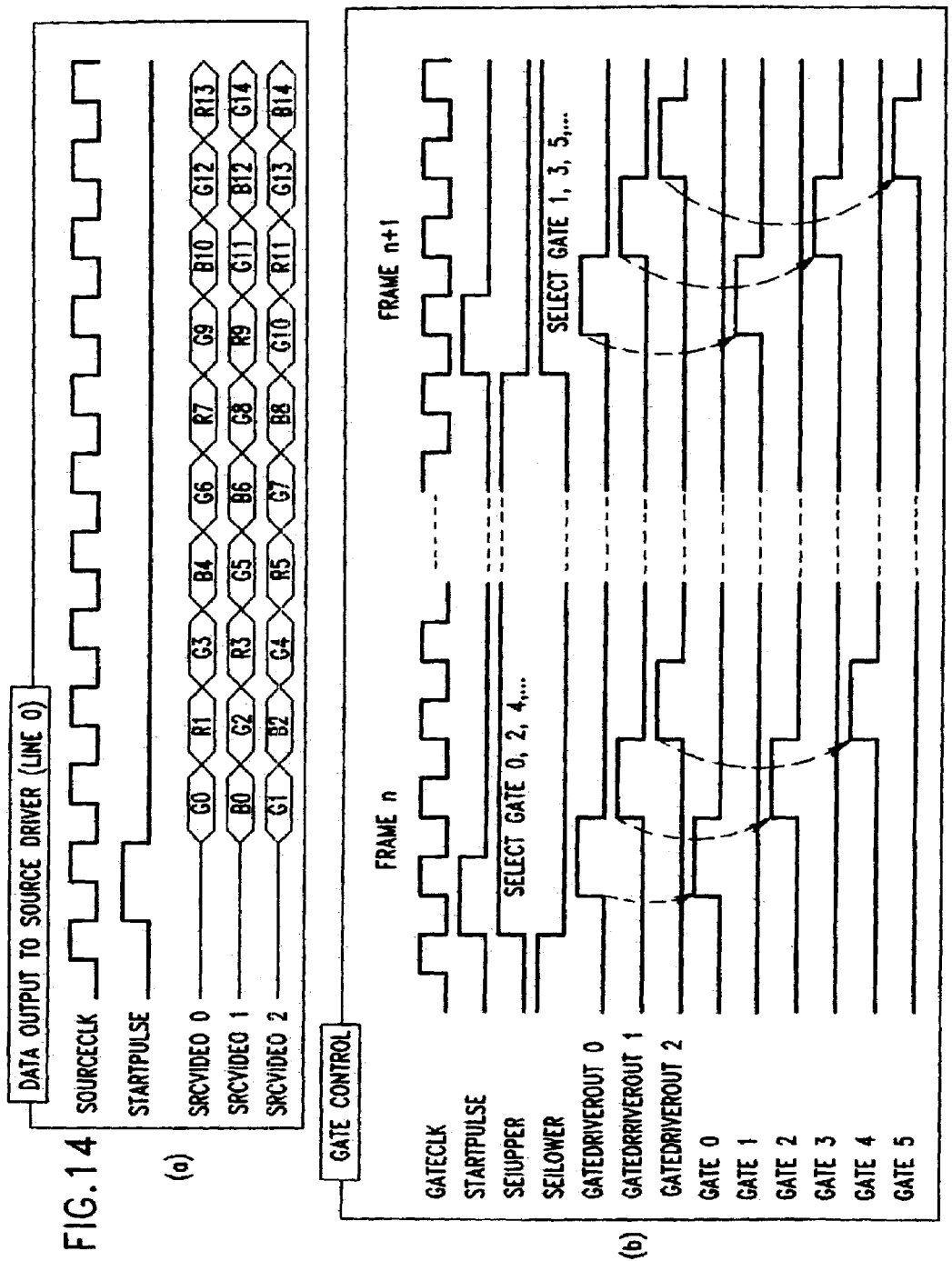

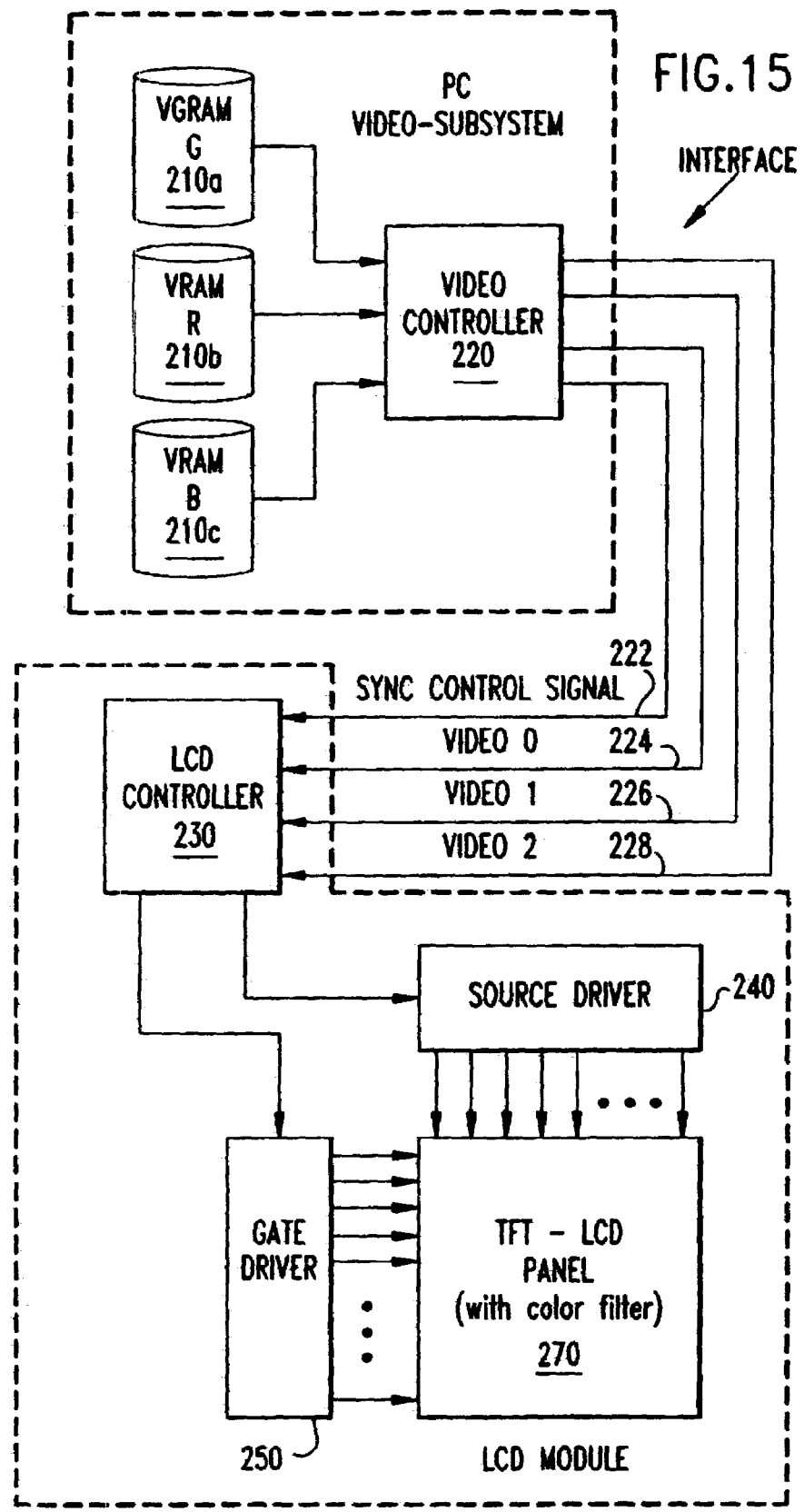

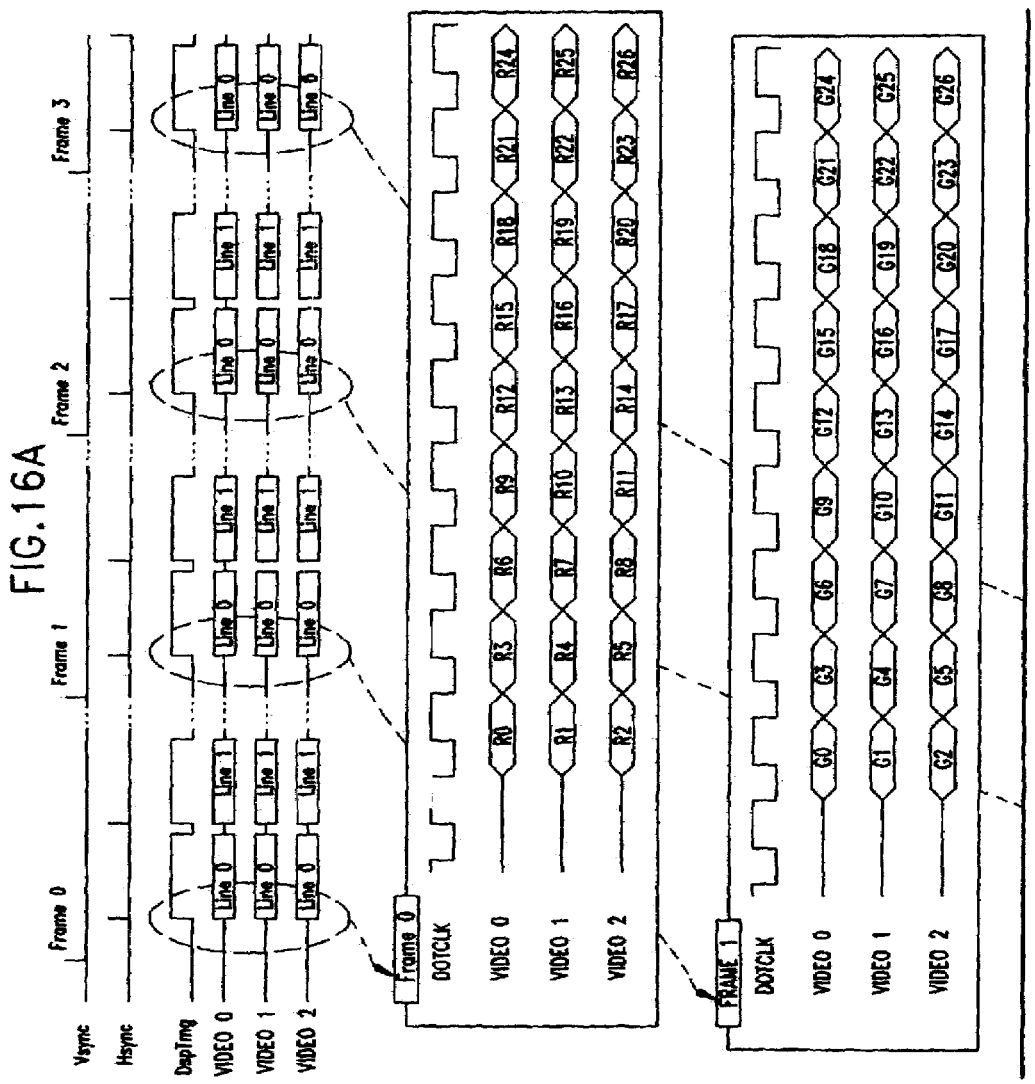

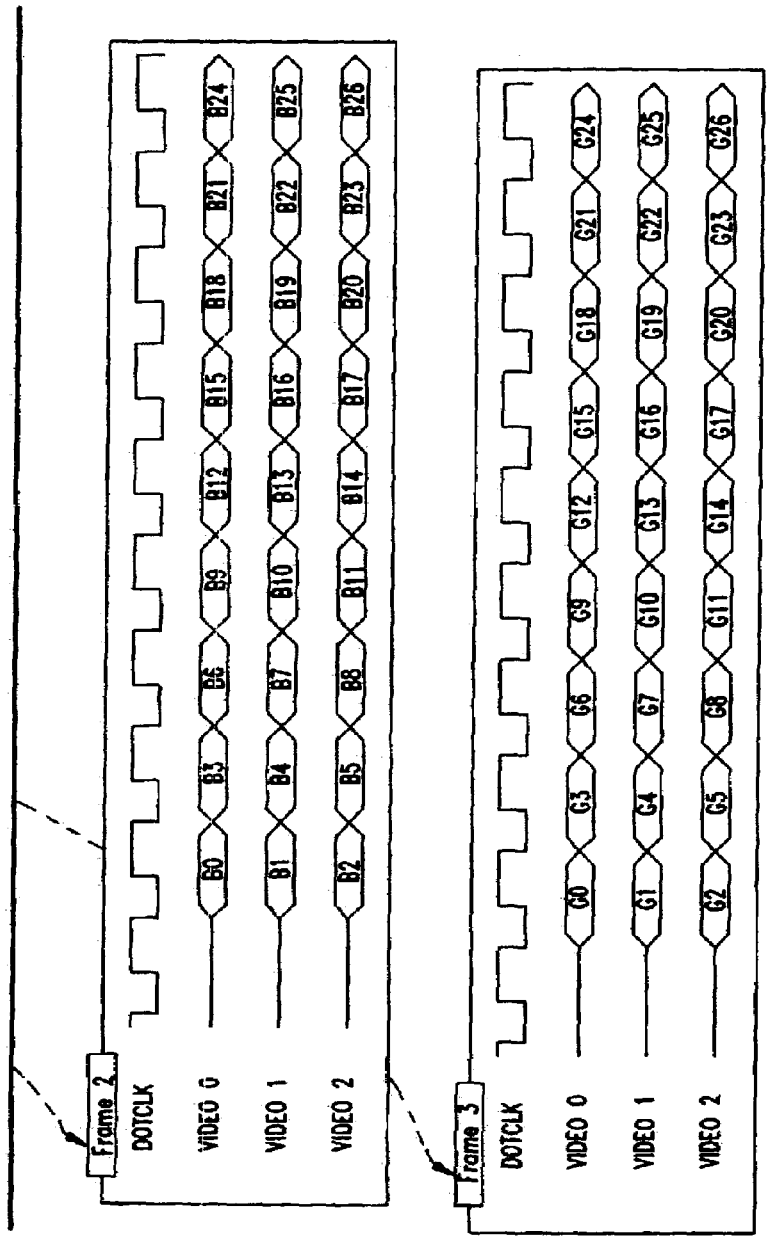

MATRIX DRIVEN LIQUID CRYSTAL DISPLAY MODULE SYSTEM, APPARATUS AND METHOD

This is a division of application Ser. No. 09/312,004, filed May 14, 1999, now U.S. Pat. No. 6,556,181.

FIELD OF THE INVENTION

This invention relates to a general color display method, and more specifically to a color display method which takes into account a difference in the sensitivities of users relative to a flicker frequency.

BACKGROUND OF THE INVENTION

An additive color mixture method is employed as a general coloring method. According to this method, when light beams of two or more colors impinge on the retina, they are mixed and are perceived as another color. This method serves as the basic principle for current color display devices. R (red), G (green) and B (blue) are employed as three discrete color beams (beams of primary colors that cannot be produced by mixing another two colors). Another method that is used is a subtractive color mixture method for which are employed three complementary color beams, C (cyan), M (magenta) and Y (yellow) that respectively are complements of R (red), G (green) and B (blue). With a color television (CRT: Cathode Ray Tube), which is a typical example device that employs these color mixtures, colors are mixed by the light emitted by a RGB phosphor array. Color liquid crystal display devices are also based on this idea.

FIG. 1 is a specific diagram showing the arrangement of pixels and sub-pixels for RGB colors used to display a color image on a liquid crystal display device (LCD). According to the most popular arrangement, a pixel 10 is divided into three R (red), G (green) and B (blue) segments (an R primary color sub-pixel 11, a G primary color sub-pixel 12 and a B primary color sub-pixel 13), and these segments are driven using signals corresponding to the individual colors to display the color image. In other words, when light beams pass through minute RGB color filters they are mixed. An additive color mixture is obtained by producing a light beam having a single color from a set of minute points of different colors, i.e., by the effect provided by the inability of the human eye to spatially resolve colors. Such a mixture is called "parallel additive color mixture."

Furthermore, even when the speed in changing colors exceeds the limit of the speed of resolution for the human eye, i.e., when the colors flicker too fast and can not be distinguished, mixed colors can be seen. This is called a "continuous additive color mixture." This phenomenon occurs as a result of the afterimage characteristic of the eye. As an additional method, there is a "simultaneous additive color mixture" method that is used for a projection type CRT or LCD that simultaneously projects the three primary colors onto a screen to produce a color mixture. This is an example of the typical additive color mixture phenomenon. According to the principle of simultaneous additive color mixing, when RGB primary color beams are emitted at the same time and to the same space (same location), an additive color mixture is enabled. However, color for a direct-vision CRT or LCD depends on spatiotemporal color mixing.

When an information display device displays motion pictures, in order to replay movements using the afterimage characteristic of the human eye, image data to be displayed must be rewritten (i.e., next data writing performed) using a time unit that is adequately shorter than the afterimage time. When the length of this rewriting time is greater than the response time of the human eye, a person viewing motion pictures experiences a flickering sensation and the movement in the pictures seems clumsy.

To display still pictures, except when pictures are displayed by an information display device having a memory, the display contents must be changed (i.e., next data written) at such a speed that a person experiences no flickering sensation, in accordance with the period display information is held in the information display device.

A display principle that does not require much memory and provides a high response speed tends to be employed for a display device, such as a television or an information processor, that needs to display both motion and still pictures. In this case, refresh frequency and a refresh rate for the display contents tend to be determined while taking into account the sensitivity to flickering of the human eye. Generally, since the refresh frequency is high, a person seldom experiences the flickering sensation and a clear display having a high quality can be provided.

It should be noted that there is a considerable time difference between a "display" period or a "display in progress" period and an image data "writing" period. This difference varies depending on the display principle that is employed. It is natural for the "display" period or the "display in progress" period, which is the result of data writing, be much longer than the "writing" period that is the source of the display. In addition, since the display is provided in response to the data writing, a time lag or delay occurs between the two periods.

As an example, for a liquid crystal display, a capacitor can hold a charge for a period much longer than a signal voltage writing period. In other words, the LCD has a specified memory capacity. That is, when an active device, such as a TFT, is provided for individual sub-pixels, the degree of freedom for the adjustment of a capacitor is larger. For a CRT, it appears that the phosphors emit light longer than the writing period. Therefore, the CRT can display, or can continue to display, data substantially longer than the writing period. It is important here that when the rate of data writing is increased, the same effects can be obtained as those that are obtained when the display period is substantially extended. This is a refresh period, and can be understood instinctively.

For a liquid crystal display, the time response speed for a display varies in accordance with the display mode (principle): from several tens to several hundreds of milliseconds at the least, and as the refresh frequency is increased, the degree of freedom for technical selection is reduced. The speed at which the orientation of the liquid crystal sandwiched between electrodes is changed, in accordance with charging/discharging, corresponds to a so-called "drive speed" or "(time) response speed" of liquid crystal. Since some driving power is consumed each time a display is repeated, power is wasted. Therefore, generally, a low refresh rate is better, as long as there is no deterioration of the display quality.

Therefore, the refresh rate for an information display device is determined while taking into account the price of the device, power consumption, and the sensitivity to flickering of the human eye.

There is a "color field sequential method" that employs a "continuous additive color mixture." This is a color display method that uses color mixing in a time sharing manner. This color technique originated at the beginning of the TV age, and is still being improved on as part of the development of the liquid crystal technique. The color field sequential method is sometimes called a "time-sharing method," but this may be misunderstood as time-sharing driving (dynamic driving), and for this specification, the color field sequential method that is popular as the TV method is employed.

In the United State, the color field sequential method was employed for color broadcasting from 1950 to 1953. However, since the color TV standard method was standardized, as an NTSC method that is compatible with the monochrome method, development of the color field sequential method was halted. The color field sequential method, however, has potential merits in that it is superior to other methods in hue replaying and that high resolution is available, due to the fact that a shadow mask is not required for a CRT, and because as only ⅓ of a pixel is required for an LCD, thereby allowing the number of pixels to be increased three times.

In FIG. 2 is shown a drive principle for the color field sequential method. In the prior art, one color image on the left side is divided in a time sharing manner at the same intervals as for RGB colors; image segments for each color are repetitiously displayed from the top (from the top to the bottom in FIG. 2) in the order red (R), green (G) and blue (B); and at least three colors are employed to complete one picture.

Since the display contents must be changed (i.e., next data writing) in the order R. G and B, pictures for G and B must be displayed in a period extending from the time an R picture is displayed until the next R picture is displayed. For an R picture, accordingly, flickering is noticeable compared with R pictures that are constantly displayed. Therefore, for each color a division count for the time unit is considered to be the measurement that indicates the flickering frequency (normally, a time sharing count is employed but another count can be employed), and it is important that eye sensitivity be evaluated in accordance with the division count.

The most common measurement used for indicating a division count for the time unit is a "scanning frequency." The scanning includes as a broad definition the analyzation or assembly of image data. The scanning is required for repetitiously writing on the display device.

It is well known that the sensitivity of the eye to flickering light is affected by the frequency of the flickering and the brightness of the light. The relationship between white light and the frequency of flicking was also the subject of an experiment into the prior art. In FIG. 3 are shown the results of the experiment conducted for the prior art. In this example, the discrimination threshold was measured for stimulus light where luminance was changed as a sinai wave as time elapsed. The vertical axis represents the modulation amplitude, and shows that the degree of modulation increased from the top to the bottom. The horizontal axis represents a modulation frequency and shows the threshold values obtained when retinal illuminance is changed from 77 to 850 and to 9300. The results shown are for a bandpass type filter, with the frequency at the peak increasing as the retinal illuminance was increased. The shielding high-frequency increased as the modulation degree increased.

When the flickering frequency of stimulus light is low, a so-called flicker occurs and the degree of brightness changes as time elapses. When the flickering frequency is high, so-called fusion occurs and the degree of brightness appears to be uniform. The flickering frequency that corresponds to the critical point is called the "critical flicker frequency (CFF)." According to what is known as the Ferry-Porter rule, within a specific frequency range the CFF ($F_c$ or FC) is proportional to the logarithm of luminance L of stimulus light. This relationship is represented by the following equation.

$$F_c = a \times \log(L) + b \text{ ($a$ and $b$ are positive constants)} \tag{1}$$

As is apparent from the results shown in FIG. 3, the frequency at the peak increased as the illuminance was increased, thereby proving the Ferry-Porter rule. As is easily understood from the above equation, the CFF is lowered as the luminance L is reduced. However, this rule is merely obtained for so-called white light that is produced as the result of the additive color mixture, and is not obtained by R, G and B decomposition.

The relationship between CFF ($F_c$ or CF) and the frequency has not yet been analyzed for each color R, G and B. The prior art treats the three primary colors equally. Since the CFF is an indicator for a frequency that constitutes a refresh frequency required for a time unit, it is very important that the CFF for each color be precisely ascertained. This is because since the spectral luminous efficacy affected by the brightness differs for the R, G and B colors, the flickering frequency may also differ for the R, G and B colors.

If such a condition exists, it would be not economical for a flickering frequency that is higher than necessary to be provided for a color that a person does not perceive very well. In addition, a person will visually feel uncomfortable if a satisfactory refresh frequency is not provided for a color that the person perceives well. This is important for a color sequential method whereby R, G and B data must be sequentially written.

It is, therefore, one object of the present invention to provide a color display method whereby flickering frequencies for RGB primary colors are not treated equally, while taking into account the fact that the sensitivity of the human eye relative to a flickering frequency differs for each color.

It is another object of the present invention to provide a matrix driving liquid crystal display module that is appropriate for the above color display method, and a PC system that includes such a module.

It is an additional object of the present invention to provide a double-panel projection type display device that is appropriate for the above color display method.

SUMMARY OF THE INVENTION

These and other objectives are realized by the present invention including a color display method, for sequentially writing to a display device for individual primary colors image data consisting of at least three primary colors, which comprises, for a minimum unit for the repetitious writing of the image data, the steps of: writing first primary color image data; writing second primary color image data; and writing third primary color image data, wherefor the frequency for the writing of the first primary image data is higher than the frequency for the writing of the second primary color image data or the frequency for the writing of the third primary color image data. A display method whereby the writing frequency is represented as a display period or a display method whereby the writing frequency is represented as a scanning frequency can be provided.

According to another aspect of the employment of the drive principle or the display principle of the present invention, a color display method, whereby image data that consist of at least three primary colors are sequentially displayed for only two primary colors to a display device, comprises, for a minimum unit for the repetitious display of the image data, the steps of: substantially continuing to display first primary color image data during the minimum repetitious unit; and sequentially displaying second and third primary color image data.

As a device appropriate for the display method of the present invention, a projection type display device, which displays image data consisting of at least three primary colors, green (G), blue (B) and red (R), comprises: a projection light source; a green sub-display device for the exclusive display of green (G) image data; and a blue/red sub-display device for the exclusive display of blue (B) and red (R) image data.

As a liquid crystal display module structure appropriate for the display method of the present invention, provided is a liquid crystal display module, which includes a plurality of source lines and a plurality of gate lines as a matrix, wherein at least two gate lines are prepared for each of a plurality of first primary color sub-pixels, and wherein the first primary color sub-pixels can be driven in a matrix by either of the two gate lines.

As a liquid crystal display module structure appropriate for the display method of the present invention, a liquid crystal display module, which includes as a matrix a plurality of source lines and a plurality of gate lines, comprises: a plurality of first primary color sub-pixels, which are driven in a matrix by source lines, exclusively used for a first primary color, that are located so as to constitute every other source line and by adjacent paired gate lines lying on either side that form a display line; a plurality of second primary color sub-pixels, which are driven in a matrix by source lines, other than those used for the first primary color, that are used for both second and third primary colors and by adjacent paired gate lines lying on one side that form a display line; and a plurality of third primary color sub-pixels, which are driven in a matrix by source lines, other than those used for the first primary color, that are used for both second and third primary colors and by adjacent paired gate lines lying on the other side that form a display line.

While taking into consideration the TFT liquid crystal display module structure, a liquid crystal display module, which includes a plurality of source lines and a plurality of gate lines as a matrix, comprises: a plurality of first primary color display switching devices, which, to enable active matrix driving, are connected to source lines, for the exclusive use of a first primary color that are positioned so as to constitute every other source line, and to adjacent paired gate lines lying on both sides that form a display line; a plurality of second primary color display switching devices, which, to enable active matrix driving, are connected to source lines that are used for both second and third primary colors and are those other than the first primary color source lines, and to the adjacent paired gate lines lying on one side that form a display line; and a plurality of third primary color display switching devices, which, to enable active matrix driving, are connected to source lines that are used for both second and third primary colors and that are those other than the first primary color source lines, and to the adjacent paired gate lines lying on the other side that form a display line.

While taking into consideration the TFT liquid crystal display module structure, a liquid crystal display module, which includes as a matrix a plurality of source lines repetitiously arranged in the order a first primary color source line, a second primary color source line and a third primary color source line, and a plurality of gate lines, comprises: a plurality of first primary color display switching devices, which are connected to source lines, exclusively used for a first primary color, and to adjacent paired gate lines lying on both sides that form a display line so as to enable active matrix driving; a plurality of second primary color display switching devices, which are connected to source lines, used for a second primary color, and to the adjacent paired gate lines lying on one side that form a display line, so as to enable active matrix driving; and a plurality of third primary color display switching devices, which are connected to source lines, used for a third primary color, and to the adjacent paired gate lines lying on the other side that form a display line, so as to enable active matrix driving.

Further, as a component simultaneously mounted on a TFT liquid crystal display module, a liquid crystal display module comprises a line selector device for switching selectively only even-numbered or odd-numbered adjacent paired gate lines that form a display line.

In addition, provided is a liquid crystal display module, which further comprises, as components simultaneously mounted to a TFT liquid crystal display module, a source driver, a gate driver and an LCD controller.

Also provided is a personal computer (PC) system which includes a video sub-system that can reduce the number of channels at an interface by employing an output channel.

According to the present invention, the display frequency and the power consumption of the display device can be reduced without deteriorating the display quality. Further, requests for the time response speed of the display device can be reduced.

BRIEF DESCRIPTION OF THE DRAWINGS

The invention will now be described in greater deatil with specific reference to the appended drawings wherein:

FIG. 2 is a diagram showing the conventional principle according to which image data are driven by a sequential color field method;

FIG. 4 is a graph showing spectra emitted by R, G and B LEDs that were employed for an experiment to ascertain the time frequency characteristics of vision;

FIG. 7 is a diagram showing an example arrangement for components for an example when the present invention is employed for a sequential color liquid crystal display device of a single-panel projection type, and a drive waveform and a lamp drive waveform for an LCD panel;

FIG. 8(*a*) is a diagram illustrating an example arrangement of a conventional sequential color liquid crystal display device of a triple-panel projection type;

FIG. 8(*b*) is a diagram showing an example arrangement for a sequential color liquid crystal display device of a double-panel projection type for which the present invention is employed, and a drive waveform and a lamp drive waveform for an LCD panel;

FIG. 9 is a diagram illustrating an example arrangement for a personal computer (PC) system that includes an LCD module and a video sub-system, that employs the present invention for a panel having a color filter, and that can reduce the refresh rate for red (R)/blue (B) video data while maintaining a high refresh rate for green (G) video data;

FIG. 14(a) is a specific diagram showing signals output by an LCD controller in the PC system in FIG. 9;

FIG. 14(b) is a specific diagram showing signals used to control gate lines in the PC system in FIG. 9;

FIG. 15 is a diagram illustrating an example arrangement for a personal computer (PC) system that includes an LCD module and a video sub-system, that employs the present invention for a panel without a color filter, and that can reduce the refresh rate for red (R)/blue (B) video data while maintaining a high refresh rate for green (G) video data;

FIG. 16 is a specific diagram showing the signals output by a video controller in the PC system in FIG. 15.

DESCRIPTION OF THE PREFERRED EMBODIMENT

To resolve the above described shortcomings, an experiment was conducted to measure a frequency property for vision, which is eye sensitivity, for each of the monochromatic light colors R, G or B (full wave half maximum (FWHM): 20 to 35 nm). In FIG. 4 is shown the spectra of LEDs used in the experiment. The horizonal axis represents a wavelength, and the vertical axis represents a relative intensity. The relative intensity is a normalized value while the maximum intensity for each of the R, G and B spectra is 1.

Figure 5:
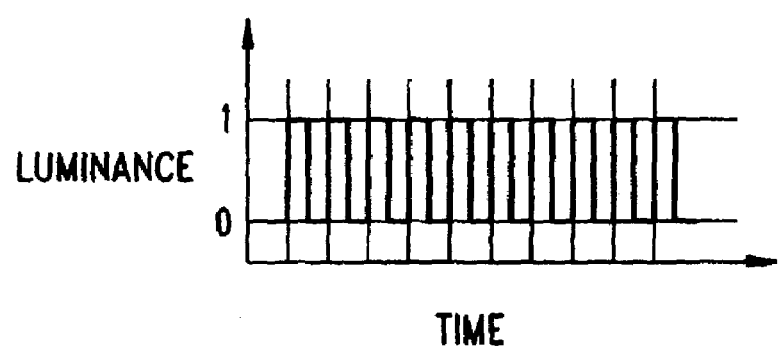
FIG. 5 is a graph according to the present invention showing a modulated rectangular wave that is provided for R, G and B emission by LEDs employed for the experiment to ascertain the time frequency characteristics of vision.
Figure 3:
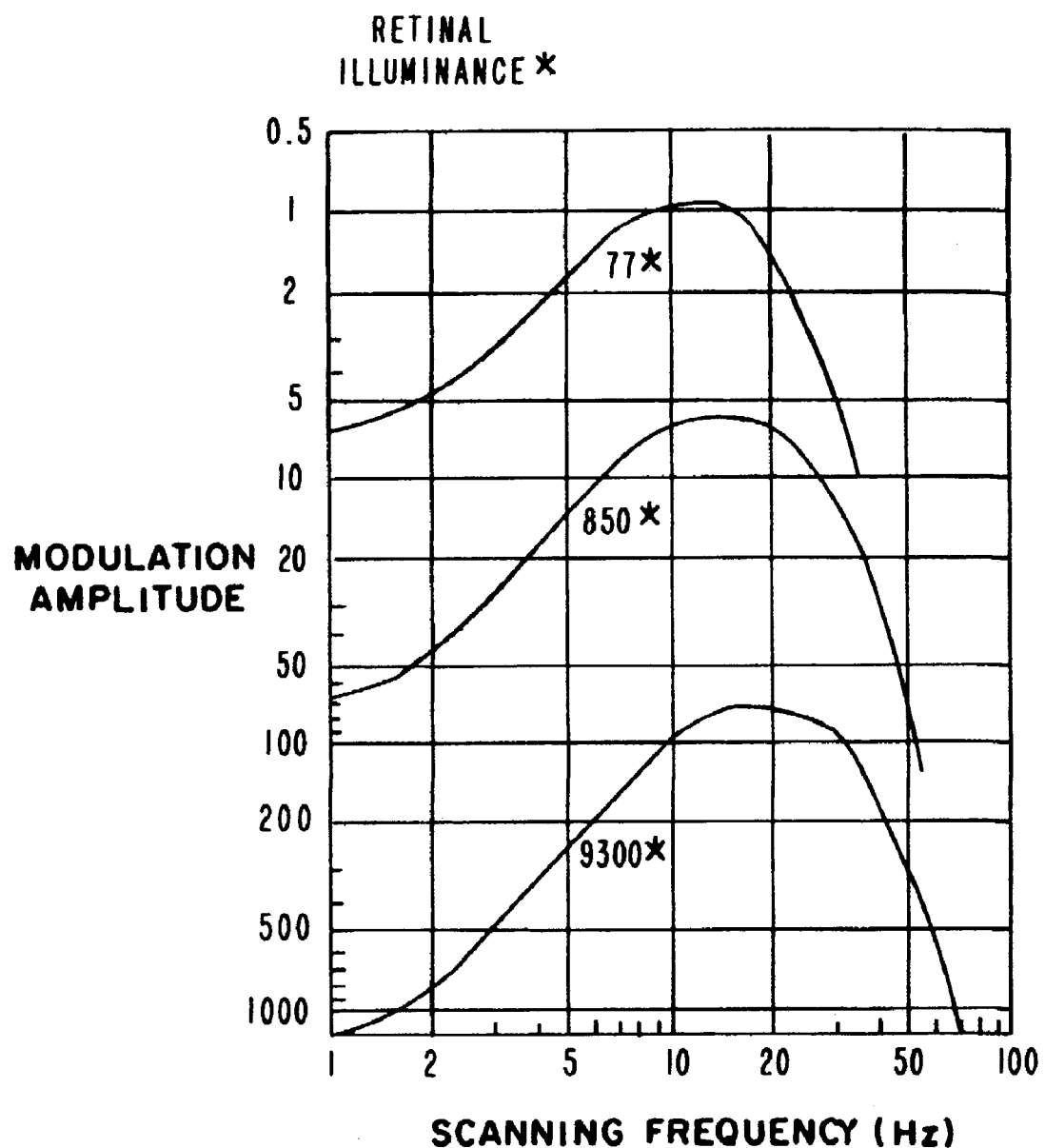
FIG. 3 is a graph showing the conventional results obtained by measuring the discrimination threshold for stimulation light for which a luminance change assumes the shape of in a sinal wave as time elapses.

In FIG. 5 is shown a modulated rectangular wave that was provided in order to obtain the LED emissions. The modulated rectangular wave is for a repeated simple blinking (ON/OFF) light, and is not a sine wave. That is, a duty ratio of 50% was employed. An experiment was conducted for several subjects who observed this emitted light, and the critical flickering frequency (CFF) was examined. As a result, the following trend was obtained:

$$\text{CFF for G (green) light beam} \approx 50 \text{ Hz} \qquad (2)$$

$$\text{CFF for R (red) light beam} \approx 30 \text{ Hz} \qquad (3)$$

$$\text{CFF for B (blue) light beam} \approx 35 \text{ Hz} \qquad (4)$$

As is shown in FIG. 2, the conventional liquid crystal display of color sequential type sequentially displays red, green and blue colors, and employs at least three colors to complete a single picture. When with this method a single color, for example, green, is to be displayed for an entire picture, a black light beam must be emitted at the time the other colors (red and blue) are to be displayed, and this condition substantially resembles the condition where green (G) light blinks at a frame frequency. This phenomenon must be taken into consideration for a direct-vision display device.

Figure 6:
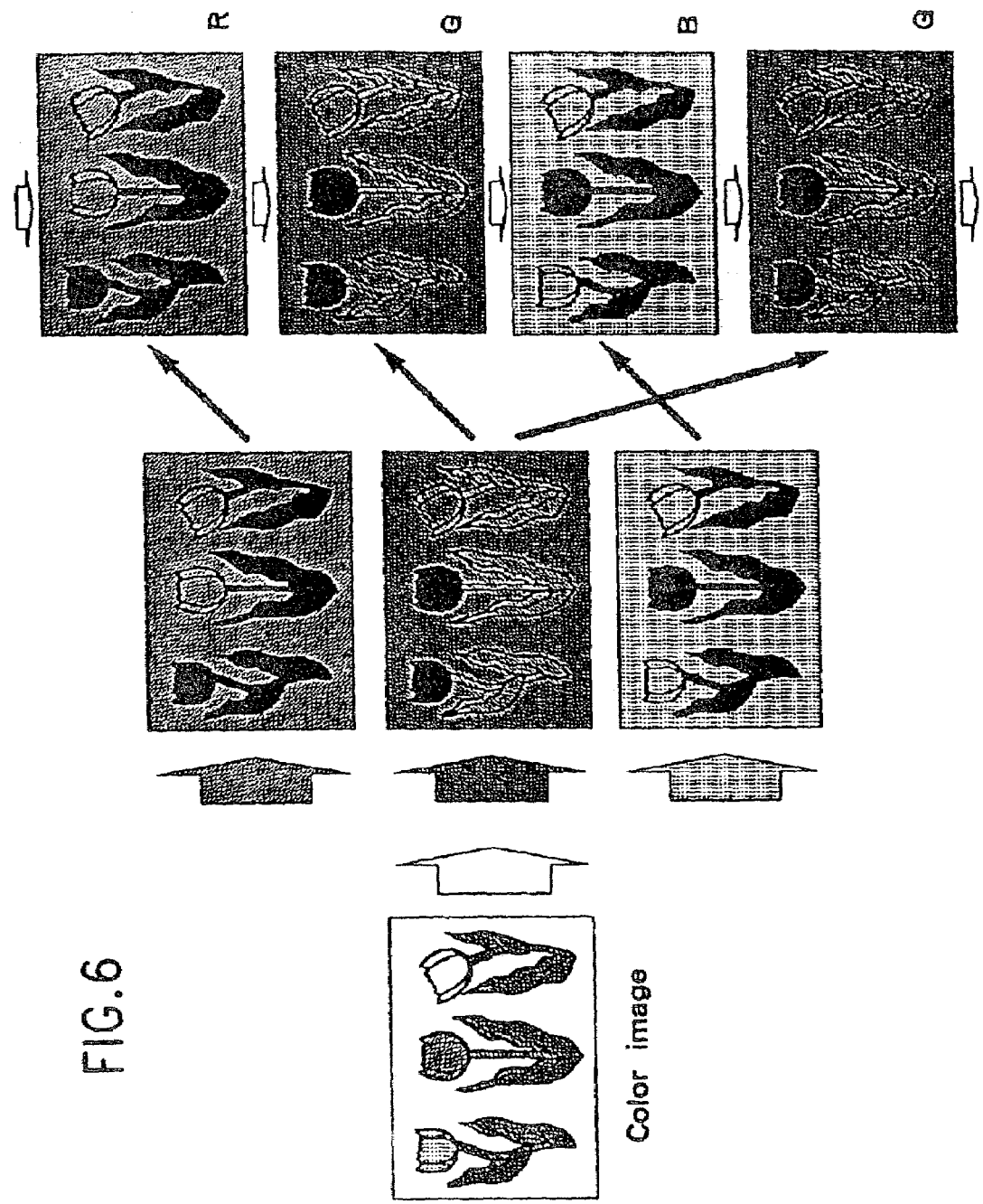
FIG. 6 is a diagram showing a driving principle according to one embodiment when the present invention is employed for a sequential color field method.

In FIG. 2, for example, the "minimum repetitious unit," which is a set of red (R), green (G) and blue (B) colors used to display a complete screen, is also called a "frame" (this definition is applied to the explanation while referring to FIG. 6). When the time required for displaying a complete screen is $T_f$, $1/T_f$ is called a "frame frequency." In the color sequential method, red (R), green (G) and blue (B) color displays are called individual "fields." In this example, when an entire green screen is to be displayed, the frame frequency happened to be equal to the field frequency.

To prevent flickering, the field frequency $FS_G$ for green (G) should be $$FS_G \text{-} FC_G \qquad (5),$$

and similarly, the field frequencies $FS_R$ and $FS_B$ for red (R) and blue (B) should be $$FS_R \text{-} FC_R \qquad (6),$$

$$FS_B \text{-} FC_B \qquad (7).$$

The measurement examples (2), (3) and (4) are obtained using a duty ratio of 50%. Assuming that the results are not changed even at a ⅓ duty ratio (33.3%), $$FS_G \text{---} 50 \text{ Hz} \qquad (8)$$

$$FS_R \text{---} 30 \text{ Hz} \qquad (9)$$

$$FS_B \text{---} 30 \text{ Hz} \qquad (10)$$

are obtained, and the lowest field frequencies that to prevent flickering differ for three primary colors.

The color field sequential display device must be driven at the CFF for green (G) that the subjects can best perceive, so that the subjects do not experience flickering when R, G and B are sequentially displayed. Under the brightness condition and the duty ratio, the display device should be driven at 50 Hz. However, this frequency is too high for the red (R) and blue (B) color displays and is not preferable. The display time for the individual colors is 1/(50×3) seconds≈6.7 mil seconds.

In FIG. 6 is shown one embodiment to which the technical idea of the present invention is applied. In this embodiment, two green (G) displays are repeated in a frame, which is the minimum repetitious unit for blue (B), green (G) and red (R) color displays, in the named order, and the frame frequency is 30 Hz. Then, the display time for each color is 1/(30×4) seconds≈8.3 mil seconds, so that the frame frequency can be reduced while the same display quality can be maintained. As a result, the field frequency for red (R) and blue (B) is 30 Hz, and the field frequency for green (G) is 60 Hz.

Specifically, when the image is displayed at the repetitious frame frequency of 50 Hz in the prior art, the frequency for switching displays on the liquid crystal display device is the field frequency for red (R), green (G) and blue (B) and a combination of all of them (RGB), which is represented as:

$$(3(RGB) \text{ fields}) \times 50 \text{ Hz} = 150 \text{ Hz} \qquad (11).$$

In the embodiment of the present invention, the field frequency is:

$$(4(RGB) \text{ fields}) \times 30 \text{ Hz} = 120 \text{ Hz} \qquad (12).$$

The repetitious frequency can be reduced approximately to 80%, without deterioration caused by flickering.

Therefore, substantially the same flickering as that obtained from a conventional liquid crystal device having a rewriting speed of 150 Hz can be accomplished by using liquid crystal device having a low response speed of 120 Hz, to which the technical idea of the present invention is employed. Since the rewriting speed is reduced, even when the same liquid crystal device is employed, power consumption can be lowered.

When the present invention is applied to conventional liquid crystal device that can cope with a frame frequency of 50 Hz (a field frequency of 150 Hz), $$50\ Hz/80\%\ (0.8)=62.5\ Hz \tag{13}$$

is obtained. In other words, a high quality display can be provided that corresponds to the 62.5 Hz frequency.

This principle can be used for a sequential color field display on a CRT, and the power consumption of the CRT can be reduced by lowering the field frequency of the CRT. This principle can be employed not only for the sequential color field method, but also for various other scanning methods which take into account the characteristics for R, G and B obtained as a difference in the vision sensitivity of a person. When, for example, the principle is employed for a common liquid crystal display device, the refresh rate for red (R) and blue (B) can be reduced to about ⅗ (0.6) of the refresh rate for green (G).

Next, as is shown in FIG. 7, assume that the principle of the invention is applied to a sequential color liquid crystal display device of a single-panel projection type. In this example, only one liquid crystal display panel is prepared as a sub-display device. An R light source, a G light source and B light source are prepared for the panel, and they emit light only during their periods of exclusive use. Specifically, when image data for one field have been written for the individual colors, the light sources individually and exclusively emit light. According to another light emission method, when a light source that constantly emits light is employed, a shutter is provided to shield it for a period during which no light emission is required. Only one LCD panel need be sequentially driven as it can be used for R, G and B. On the right in FIG. 7 is shown the drive waveform produced by an LCD panel and a lamp drive waveform while taking into account its driving timing.

In FIGS. 8(a) and 8(b) are shown sequential color liquid crystal display devices of a triple-panel projection type. As is shown in FIG. 8(a), three panels for R, G and B are required as LCD panels (a so-called triple-panel type) for driving individual colors, which are sub-display devices. White light emitted by a light source, such as a metal halide lamp, is split by a dichroic mirror into three primary color, R, G and B, beams that are projected through corresponding LCDs. Finally, the light beams are again synthesized (an additive mixture) to provide a color image on a screen. In this example, the simultaneous additive mixture method is employed.

As is shown in FIG. 8(b), a sequential color method is employed only for R and B, and two LCD panels can be employed as sub-display devices. In other words, a double-panel type is provided. The important thing when applying the technical idea of the present invention is that an LCD panel for driving the color green is first set for exclusive use. In this example, the color green can substantially be displayed continuously (constantly driven). With the simultaneous additive mixture, even when the R, G and B primary color beams are emitted at the same time into the same space, color mixing can be performed. This differs from a direct vision type.

While the single-panel type display device does not require as many LCD panels and optical systems as does the triple-panel type, the image quality, such as the display density and the light quantity, is inferior. However, when the present invention is employed, provided is a sequential color liquid crystal display device of a double-panel projection type, which lies between the triple-panel type and the single-panel type and which satisfactorily includes the merits of both types with no deterioration of the image quality.

Example arrangement for a panel with a color filter In FIG. 9 is shown an example arrangement for a personal computer (PC) system that reduces the refresh rate for red (R)/blue (B) video data while maintaining a high refresh rate for green (G) video data in order to apply the technical idea of the present invention to a liquid crystal display module (simply referred to as an LCD module). In FIG. 9, video RAMs (VRAMs) 110a to 110c, and a video controller 120 are prepared for a PC video system. Main components 130 to 170 are included in an LCD module.

Specifically, these components are:

110a: a video RAM (VRAM) for green (G) color video data,

110b: a video RAM (VRAM) for red (R) color video data, and

110c: a video RAM (VRAM) for blue (B) color video data.

120: a video controller, which includes an output channel 12 for a sync control signal and output channels 124 and 126 for video data signals output for an LCD module. The video data signal output channels can be a green (G) output channel (Video Green) 124 and a red (R) and a blue (B) output channel (Video Red/Blue) 126. Of course, a red (R) output channel and a blue (B) output channel may be separately provided as usual, but it is preferable that the number of channels be reduced.

130: an LCD controller, which controls a source driver 140, a gate driver 150 and a line selector 160.

140: a source driver. A common driver can be employed, and the 2n-th output is for green (G) and the (2n+1)-th output is for red (R)/blue (B), where n=0, 1, 2, . . . . Therefore, the required output count can be reduced to about ⅔ that required by a conventional panel. Accordingly, the power consumed at the interface between the LCD controller 130 and the source driver 140, and the power consumed to drive liquid crystal 170 can be reduced to ⅔.

150: a gate driver. A common driver can be employed. The gate driver 150 performs a normal operation.

160: a line selector. A TFT array 170 that is particularly appropriate for the color display method of the present invention can selectively write green (G)/red (R) or green (G)/blue (B) image data. The number of gate lines is double that of a common panel. The line selector 160 is a switch for selecting a line across which data is to be written. This circuit is constituted by a field effect transistor (FET), but can be mounted on the panel as a TFT.

170: a TFT (Thin Film Transistor) array that selectively writes green (G)/red (R) or green (G)/blue (B).

Specific Arrangement of TFT Array 170

Figure 10A:
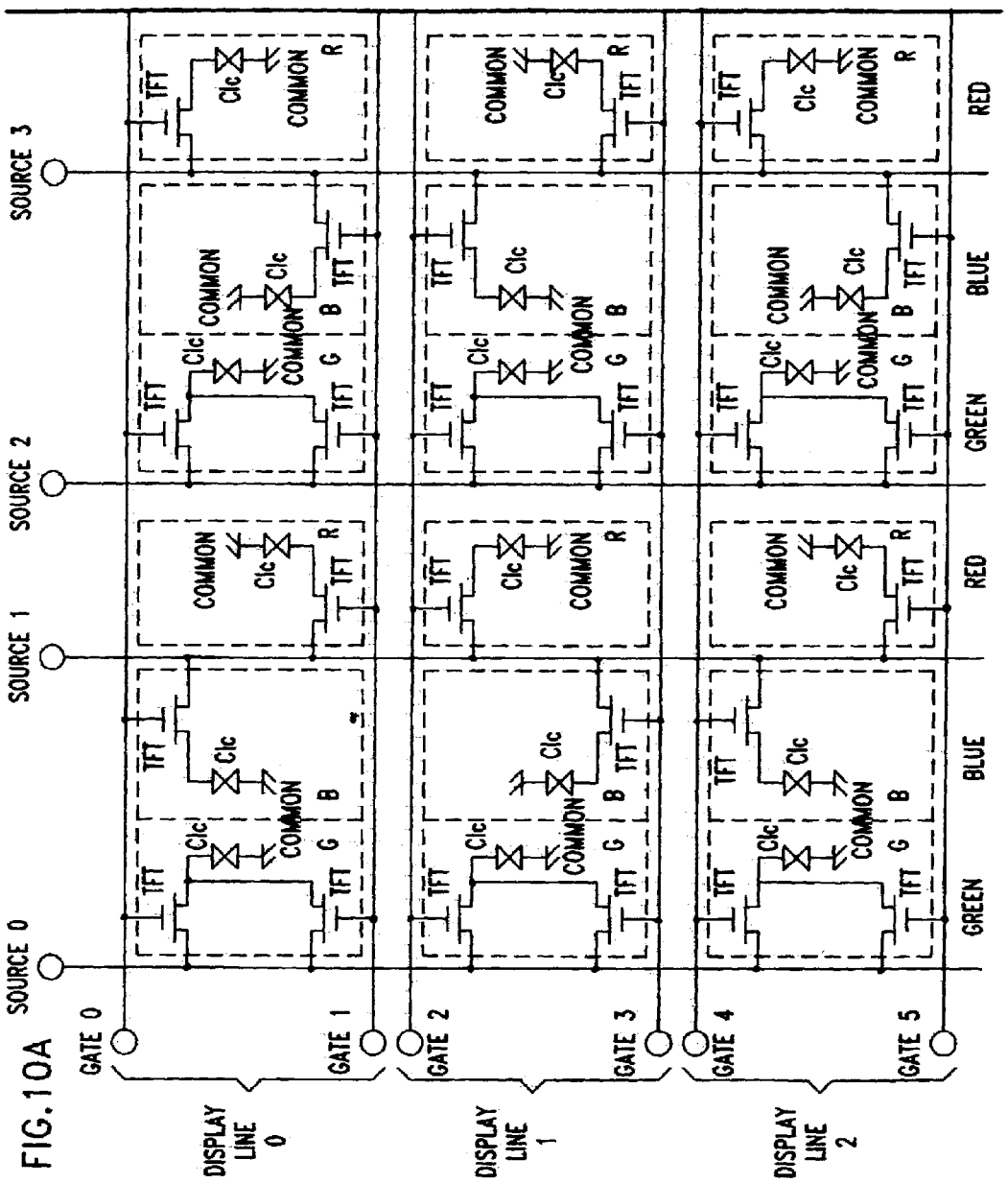
FIG. 10 is a circuit diagram showing a specific arrangement for a TFT array according to the present invention.

FIG. 10 is a circuit diagram showing the specific structure of the TFT array 170. A current in a TFT, at least one of which is provided for each sub-pixel, flows from a source electrode (an electrode connected to a source line) to a drain electrode (a common electrode Clc or Common), or vice versa. A gate electrode (an electrode connected to a gate line) serves as a gate for electrons, and, upon application of a voltage to the gate electrode, opens to allow current to pass. In this manner, the TFT-ON potential and the TFT-OFF potential are switched. That is, the TFT is a "switching device" that serves as a field effect transistor (FET). The TFT is so arranged that it can perform so-called "active matrix driving," and this switching device may be called an "active device."

In FIG. 10 is shown the extracted portion of the upper left of the TFT array 170, and this portion is repeated as a pattern. Sources 0 to 5 are source lines, and sources 0, 2, 4, . . . , which correspond to the source driver outputs, are for the exclusive use of green (G), and sources 1, 3, 5, . . . are for the use of red (R)/blue (B). Of course, these source lines 1, 3, 5, . . . can be divided into two groups employed for the exclusive use of red (R) and the exclusive use of blue (B). However, if the same lines are used for both colors, the wiring pattern of the TFT array can be simplified. This contributes to the improvement of the aperture ratio for the panel and for the manufacturing yield, and is advantageous for performance and for the manufacturing process.

Gates 0 to 5 are gate lines: gates 0 and 1 are gate lines for display line 0, gates 2 and 3 are gate lines for display line 1, and gates 4 and 5 are gate lines for display line 2. The "display line" in this specification is a line along which a plurality of primary color sub-pixels (a first primary color sub-pixel, a second primary color sub-pixel and a third primary color sub-pixel) are formed continuously.

In each frame (Frame), only the even-numbered or odd-numbered gate lines can be activated. When two gate lines are prepared (on the even-numbered side or on the odd-numbered side) for each display line and either one is activated, green (G) pixels can be written. When the video controller drives the gate line at a frame frequency of 60 Hz, green (G) data in each line can be refreshed, so that the refresh rate of 60 Hz can be maintained. The red (R)/blue (B) data are refreshed in each line, and the refresh rate is 30 Hz, which is ½ the conventional.

The components that are the minimum required for the "liquid crystal display module (LCD module)" or the "LCD panel" of the present invention are called source lines and gate lines in accordance with the technical idea of the invention. The term "module" generally defines a liquid crystal display device that also includes terminals for connection with a system, and is the general term of a sub-system that can display characters and pictures only by connecting it to a system. In this specification, it should be noted that, so long as a sub-system includes source lines and gate lines even though it is not a complete sub-system as described above, the sub-system is called a liquid crystal display module. In order to actually display data, the other components, such as liquid crystal and an opposing substrate for sandwiching it are required. These components, however, are well known to one having ordinary skill in the art, and no explanation for them will be given.

As is shown in FIG. 9, the liquid crystal display module (LCD module) includes, as additional components, the LCD controller 130, the source driver 140, the gate driver 150 and the line selector 160, which will be described later. These components are shown as being separate from the TFT array 170. However, these components can be integrally formed with the TFT array 170 and can be included as a single part of the LCD module by using a technique such as COG (Chip On Glass) or SOG (System On Glass).

Line Selector 160

Figure 11:
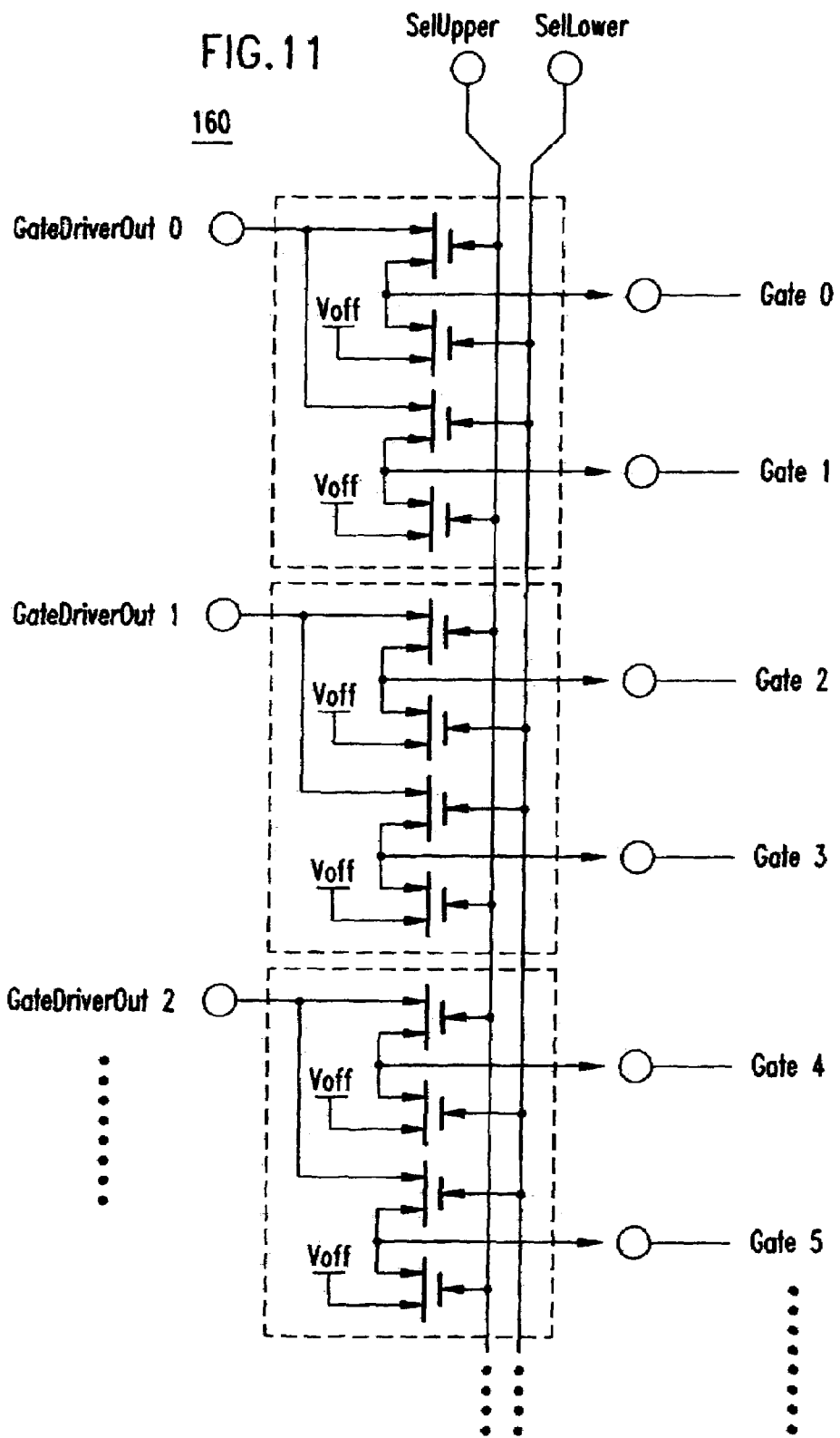
FIG. 11 is a circuit diagram showing a specific arrangement for a line selector for selecting a gate line in the TFT array in FIG. 10.

FIG. 11 is a circuit diagram illustrating the line selector 160. This circuit connects the output terminal (GateDriver-Out) of the gate driver 150 to an adequate gate line (Gate) of the TFT array 170 in FIG. 10. When SelUpper is activated, the gate driver output terminal is connected to the even-numbered gate lines (gates 0, 2, 4). When SelLower is activated, the gate driver output terminal is connected to the odd-numbered gate lines (gates 1, 3, 5). These gate lines correspond to the number of gate lines shown in FIG. 10. SelUpper and SelLower are not activated at the same time. The OFF voltage Voff of the TFT is output to the unselected gate lines. In the above process, the output terminal is connected only to the even-numbered gate lines (gates 0, 2, 4) or the odd-numbered gate lines (gates 1, 3, 5); however, it can be easily understood that only if the connection relationship existing between the red (R)/blue (B) source line and the gate lines is changed in the structure of the TFT array 170, the gate lines 0, 3, 4 and 5 can be connected first and the gate lines 1, 2, 5 and 6 then connected. Various other alterations are also possible.

Example Writing Form

Figure 12:
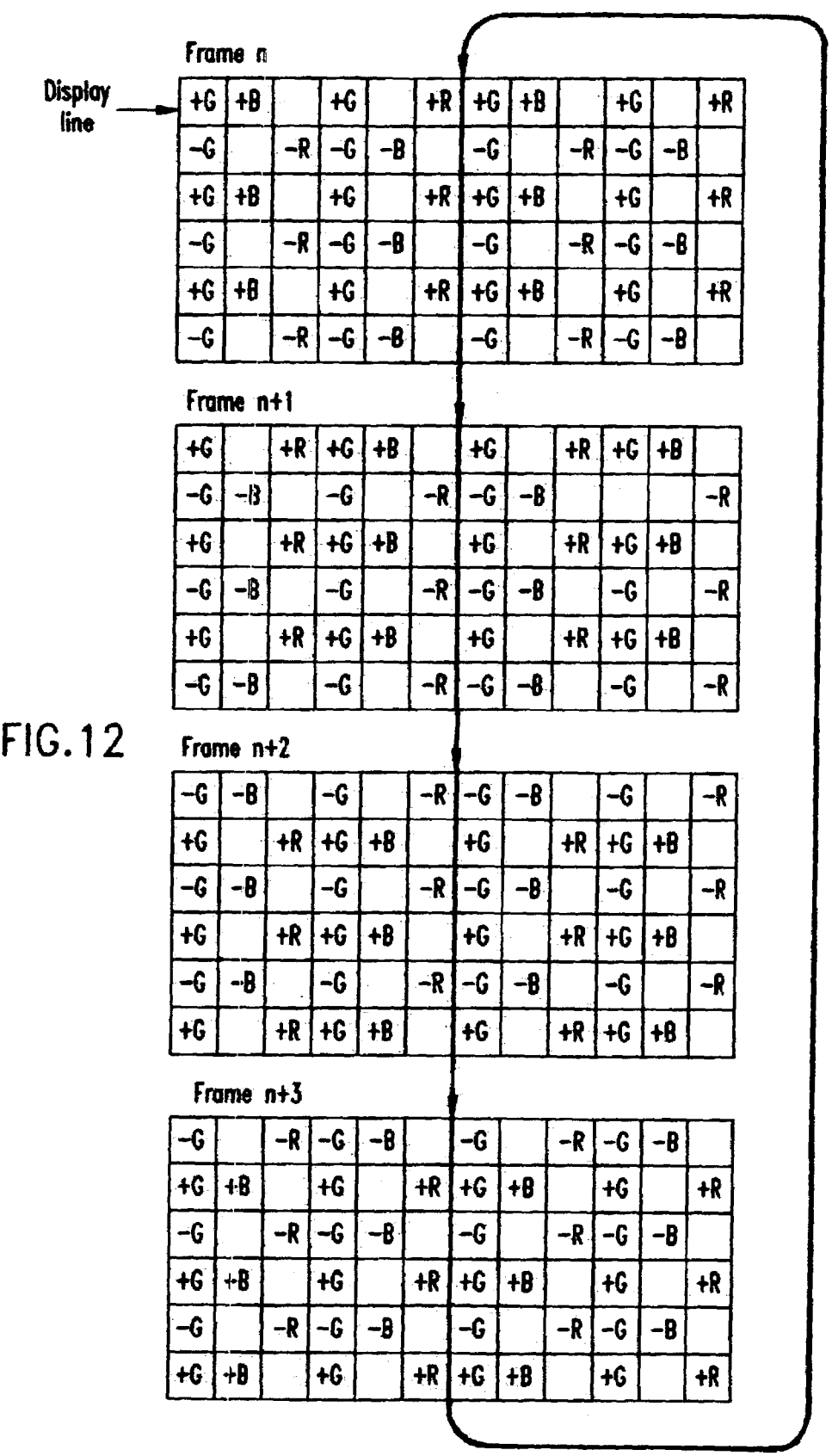
FIG. 12 is a specific diagram showing an example data writing form, for the TFT array in FIG. 10, that performs driving based on H line inversion.

In FIG. 12 is shown example data writing based on H line inversion (inversion for each H line). In FIG. 12, +G, −G, +B, −B, +R and −R denote the positive (+) and the negative (−) writing of green/blue/red data, and squares correspond to sub-pixels. Blank squares represent sub-pixels for which data are not written. While taking into account the technical idea of the present invention and the most efficient writing method based on H inversion, the AC driving is completed after four frames. The "frame" in this example does not always correspond to the definition employed for FIGS. 2 and 6.

This is only an example writing form, and it would be obvious for one having ordinary skill in the art that the technical idea of the present invention can be employed for V inversion (line inversion), dot inversion or frame inversion.

Signals for Individual Sections

Figure 13:
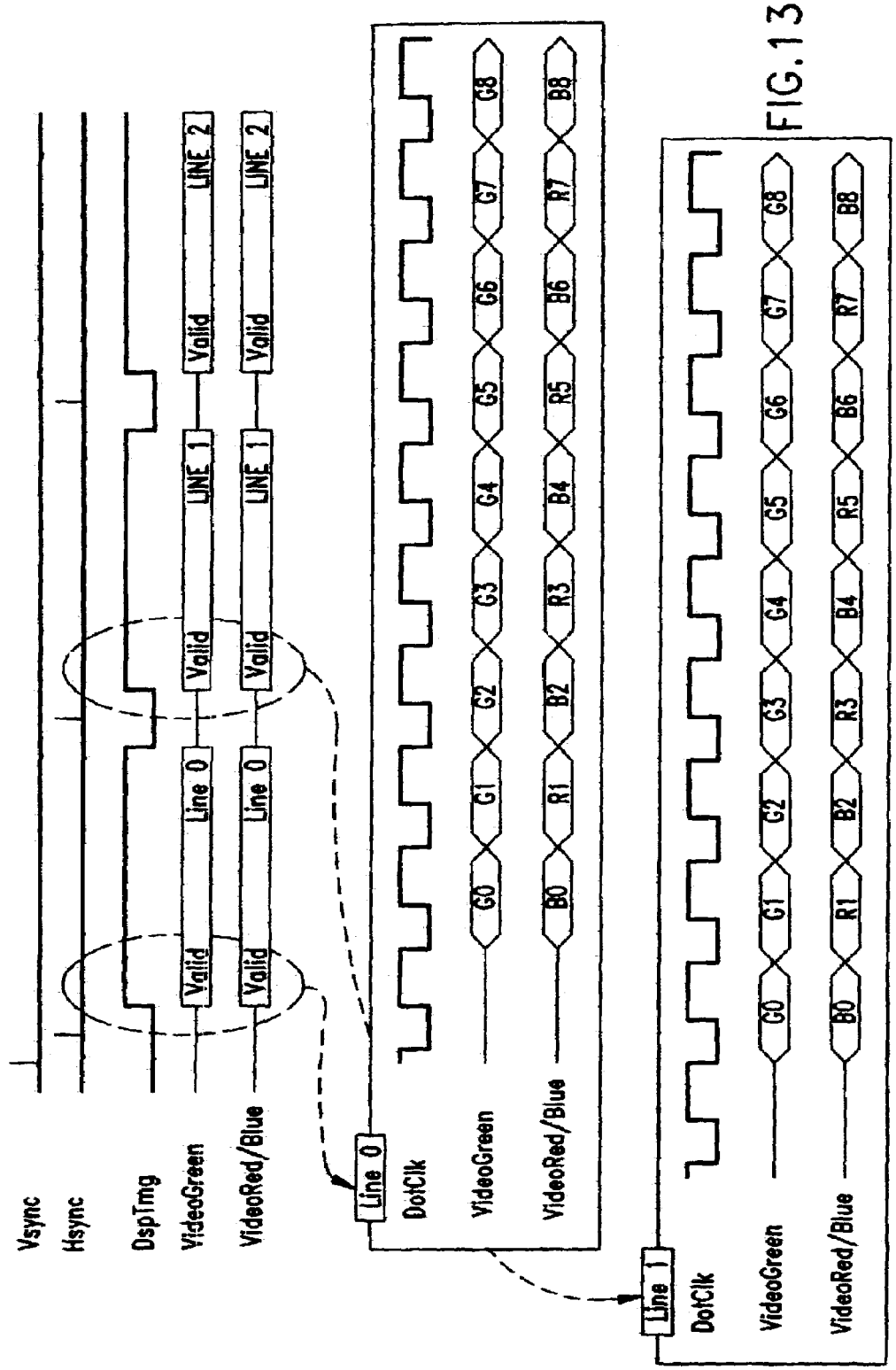
FIG. 13 is a specific diagram showing signals output by a video controller in the PC system in FIG. 9.

In FIG. 13 are shown signals output by the video controller 120. Vsync denotes a vertical synchronous control signal; Hsync, a horizontal synchronous control signal; and DspTmg, a display timing signal. In FIG. 13, first, three lines are shown in a specific frame, the enlarged diagrams (Line 0 and Line 1) indicate the beginnings of the first two lines and VideoGreen in the enlarged diagram indicates the condition of a green (G) channel, while VideoRed/Blue indicates the condition of a red (R)/blue (B) channel. Since one channel is employed as a red (R) channel, VideoRed, and a blue (B) channel, VideoBlue, the number of channels can be reduced by one at the interface with the video sub-system, as was previously explained.

Data equivalent in amount to display line 0 in frame n (Frame n) in FIG. 12 are transferred in accordance with the contents of the signals indicated in Line 0. Data equivalent in the amount to display line 1 in frame n (Frame n) in FIG. 12 are transferred in accordance with the contents of the signals indicated in Line 1. In other words, the video controller 120 outputs video data in accordance with the writing form shown in FIG. 12.

In FIG. 14 are shown signals output by the LCD controller 130. In FIG. 14(a) are shown signals output to the source driver 140, and how to sort video data for the source driver video input channels is described. Generally, the source driver 140 has video input channels corresponding to RGB colors, which are represented as SrcVideo 0, 1 and 2.

ScrVideo 0 corresponds to the source driver output terminals 0, 3, 6, 9, . . . , ScrVideo 1 corresponds to the source driver output terminals 1, 4, 7, 10 . . . , and ScrVideo 2 corresponds to the source driver output terminals 2, 5, 8, 11 . . . . Video signals are transmitted to the source driver output terminals in the order G0, B0, G1, R1, G2 . . . . Since the video data input across two channels are sorted into three channels to use a common source driver, SourceClk can be ⅔ of a frequency DotClk (FIG. 13).

In FIG. 14(*b*) are shown signals output to the gate driver 150/line selector 160 to control the gate lines. When SelUpper is activated in Frame n, the gate driver output terminal is connected to the even-numbered gate lines, and the odd-numbered gate lines are set at the TFT-OFF potential, and when SelLower is activated in Frame n+1, the gate driver output terminal is connected to the odd-numbered gate lines, and the even-numbered gate lines are set to the TFT-OFF potential.

Example Arrangement for Panel Without Color Filter

In FIG. 15 is shown an example arrangement for a personal computer (PC) system that reduces a refresh rate, while preventing the occurrence of flickering, when a panel without a color filter (a monochrome panel) is employed to perform sequential color field driving. This arrangement can be used for the projection type LCD or CRT shown in FIG. 7 or 8(*b*). In FIG. 15, video RAMs (VRAMs) 210a to 210c and a video controller 220 are prepared for a PC video system. The main components 230 to 250 and 270 are included in an LCD module.

Specifically, these components are:

210a: a video RAM (VRAM) for green (G) color video data,

210b: a video RAM (VRAM) for red (R) color video data, and

210c: a video RAM (VRAM) for blue (B) color video data.

220: a video controller, which includes an output channel 222 for a sync control signal and output channels 224, 226 and 228 (Video 0, Video 1 and Video 2) for video data signals for an LCD module. These channels are the same as conventional ones, but the order in which video data are transferred differs.

230: an LCD controller, which controls a source driver 240 and a gate driver 250.

240: a source driver. A common driver can be employed. Since one pixel is used in common for use for R/G/B, a required number of outputs is ⅓ because the pixel 10 in FIG. 1 need not be divided into three sub-pixels.

250: a gate driver. A common driver can be employed. The gate driver 250 performs a normal operation.

270: a monochrome TFT array. Since the pixel 10 in FIG. 1 need not be divided into three sub-pixels, and a color filter is not provided, the TFT array 270 can attain a high light transmission rate.

Signals for Individual Sections

In FIG. 16 are signals output by the video controller 220 for one refresh cycle (four frames (Frame 0 to Frame 3)). The three video channels, Video 0 224, Video 1, 226, and Video 2, 228, which are normally prepared, are employed for switching colors for each frame when transferring data. Compared with when data for three colors are transmitted at the same time, one horizontal cycle is reduced to ⅓. In a system having the frame frequency 60 Hz for data transfer, since one horizontal cycle is reduced to ⅓, 180 Hz is available for the frame frequency for each color.

When the refreshing of data using the present invention is performed in the order R, G, B and G, and when 30 Hz is set for refreshing R and B (the frequency for G is 60 Hz there is no deterioration due to flickering), one frame cycle is 1/(30×4) seconds. When data are transferred and written to the liquid crystal at the maximum transfer speed (the transfer speed obtained when the frequency is 180 Hz), the vertical blanking period for each frame is 1/(30×4)–1/180 seconds, i.e., approximately 2.8 mS. This period can be used as extra time for the response time by liquid crystal or for the emission of a backlight.

Figure 17:
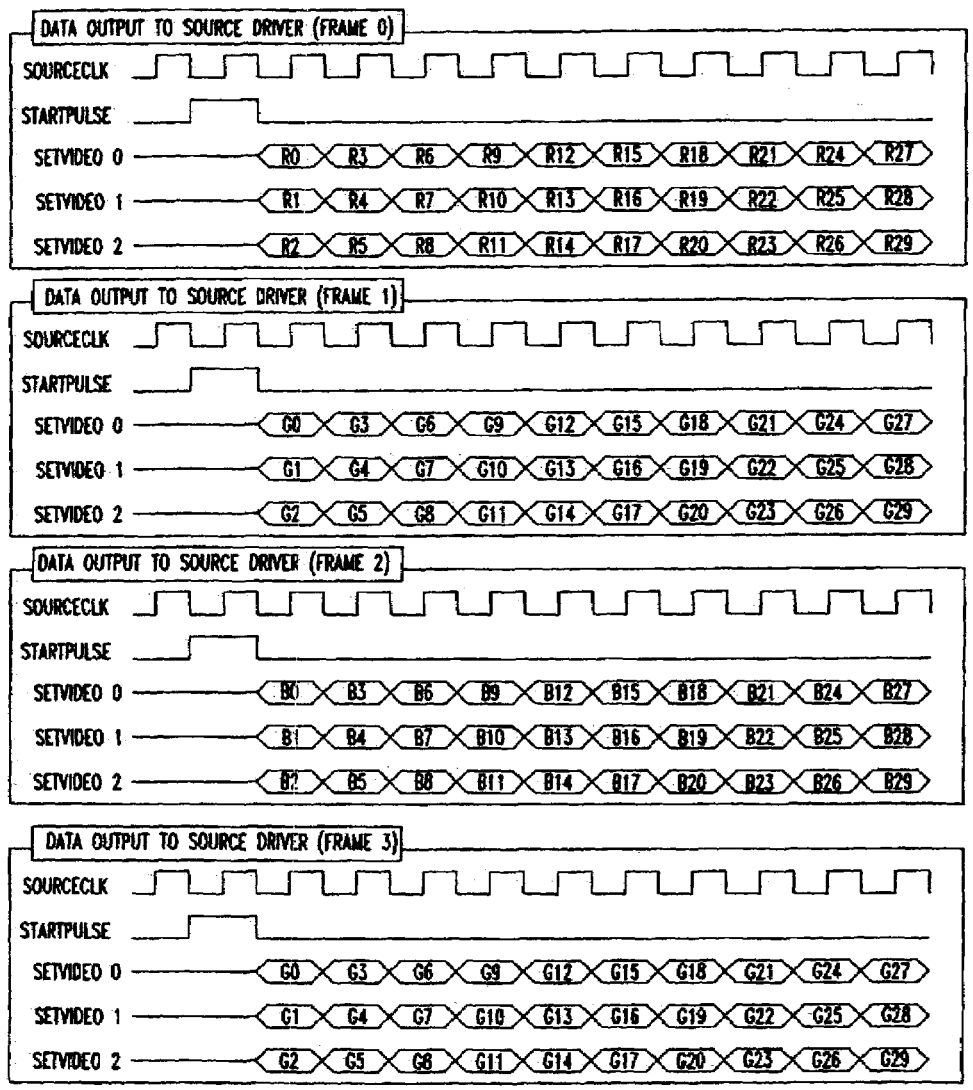
FIG. 17 is a specific diagram showing the signals output by an LCD controller in the PC system in FIG. 15.

In FIG. 17 are shown signals output by the LCD controller 230, i.e., data output to the source driver 240. Since the gate driver 250 performs a normal operation, no explanation for it will be given. A video signal from the video controller 220 is transmitted unchanged to the source driver 240.

Figure 1:
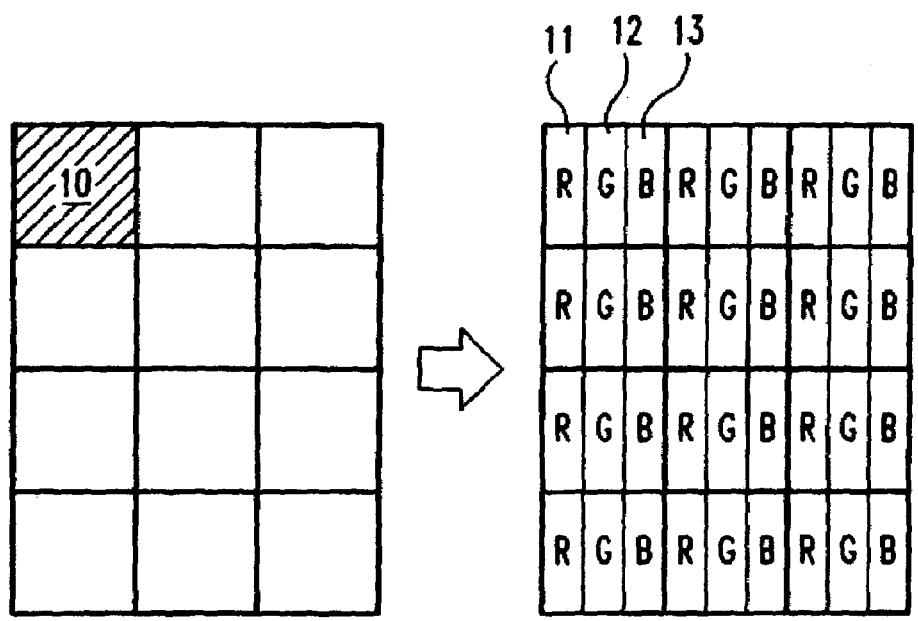
FIG. 1 is a specific diagram illustrating the arrangement of pixels and RGB sub-pixels for displaying a color image on a conventional color liquid crystal display device.

As the arrangement for sub-pixels, a stripe array in FIG. 1 has ben employed where the unit pixel 10 in FIG. 1 is divided perpendicularly into three segments for R, G and B colors (an R primary color sub-pixel 11, a G primary color sub-pixel 12 and a B primary color sub-pixel 13). It would be easy for one having ordinary skill in the art to provide a stripe array whereby a pixel is horizontally divided. Furthermore, it would also be easy for one having ordinary skill in the art to employ a mosaic array (a diagonal array) and a delta array (a triangle array).

In this embodiment, the TFT array structure that can perform active matrix driving has been employed. However, it would be easy for one having ordinary skill in the art to apply the technical idea of the present invention for an MIM (Metal Insulator Metal) structure, which is another switching device, so long as instead of a common electrode scanning electrodes equivalent in number to gate lines are prepared on an opposing substrate for sandwiching liquid crystal. Similarly, it would also be easy for one having ordinary skill in the art to apply the technical idea of the present invention for simple matrix driving (also called multiplexed driving or passive matrix driving) when an active device (a switching device) is not provided. In this case, to enable matrix driving source lines and gate lines are provided with liquid crystal sandwiched between them.

It should be noted that the patterning of electrodes on the opposing substrate is complicated because the electrodes can not be disposed uniformly (solid) across the entire surface while the opposing substrate side is employed as a common electrode. However, the patterning used for these electrodes can serve as the source lines for the TFT. The broad definition should be employed for the "source lines," including the source lines that can function as scanning electrodes.

For simple matrix driving, signal electrodes (data electrodes) can be set and serve as gate lines. Therefore, the broad definition is also employed for the "gate lines," including the gate lines that can serve as a signal electrodes (data electrodes) for simple matrix driving.

While wiring becomes increasingly complicated as the number of pixels is increased, theoretically, static driving can be employed instead of the above described dynamic driving (multiplexed driving).

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A color display method, for sequentially writing to a display device for individual primary color image data consisting of at least three primary colors, comprising, for a minimum unit for the repetitious writing of said image data, the steps of:

writing first primary color image data;

writing second primary color image data; and writing third primary color image data, wherein the frequency for the writing of said first primary image data is higher than one of the frequency for the writing of said second primary color image data and the frequency for the writing of said third primary color image data and a frame frequency of said display device is set to a critical flicker frequency for one of said second primary color image data and said third primary color image data.

2. The color display method according to claim 1, wherein the ratio of the frequency for writing said first primary color image data to the frequencies for writing said second primary color image data and said third primary color image data is set at 2:1:1.

3. The color display method according to claim 2, wherein said first primary color is G (green), said second primary color is B (blue), and said third primary color is R (red).

4. The color display method according to claim 1, wherein said first primary color is G (green), said second primary color is B (blue), and said third primary color is R (red).

5. A color display method, for sequentially displaying to a display device for individual primary color image data consisting of at least three primary colors, comprising, for a minimum unit for the repetitious displaying of said image data, the steps of:

displaying first primary color image data;

displaying second primary color image data; and displaying third primary color image data, wherein the period of time for the displaying of said first primary image data is longer than at least one of the period for the displaying of said second primary color image data and the period for the displaying of said third primary color image data and a frame frequency of said display device is set to a critical flicker frequency for one of said second primary color image data and said third primary color image data.

6. The color display method according to claim 5, wherein said first primary color is G (green), said second primary color is B (blue), and said third primary color is R (red).

7. A color display method, whereby image data on a display device that consist of at least three primary colors are scanned at predetermined frequencies for said individual primary color, comprising the steps of:

scanning first primary color image data at a first frequency;

scanning second primary color image data at a second frequency that is higher than said first frequency; and scanning third primary color image data at a third frequency that is not more than said first frequency, wherein said first frequency is set to correspond to a critical flicker frequency for one of said first primary color and said third primary color and whereby said second frequency is set to correspond to a critical flicker frequency for said second primary color.

8. The display method according to claim 7, whereof all of said first, said second and said third frequencies are not the same for scanning, but for each primary color are substantially the same as a field frequency.

9. The color display method according to claim 8, wherein said first primary color is G (green), said second primary color is B (blue), and said third primary color is R (red).

10. The color display method according to claim 7, wherein said first primary color is G (green), said second primary color is B (blue), and said third primary color is R (red).

* * * * *